Feb. 13, 1934.    R. BIHLER    1,947,285
APPARATUS FOR MANUFACTURE OF POWDER PUFFS
Filed June 23, 1930    3 Sheets-Sheet 1

INVENTOR
Roger Bihler
BY
ATTORNEYS

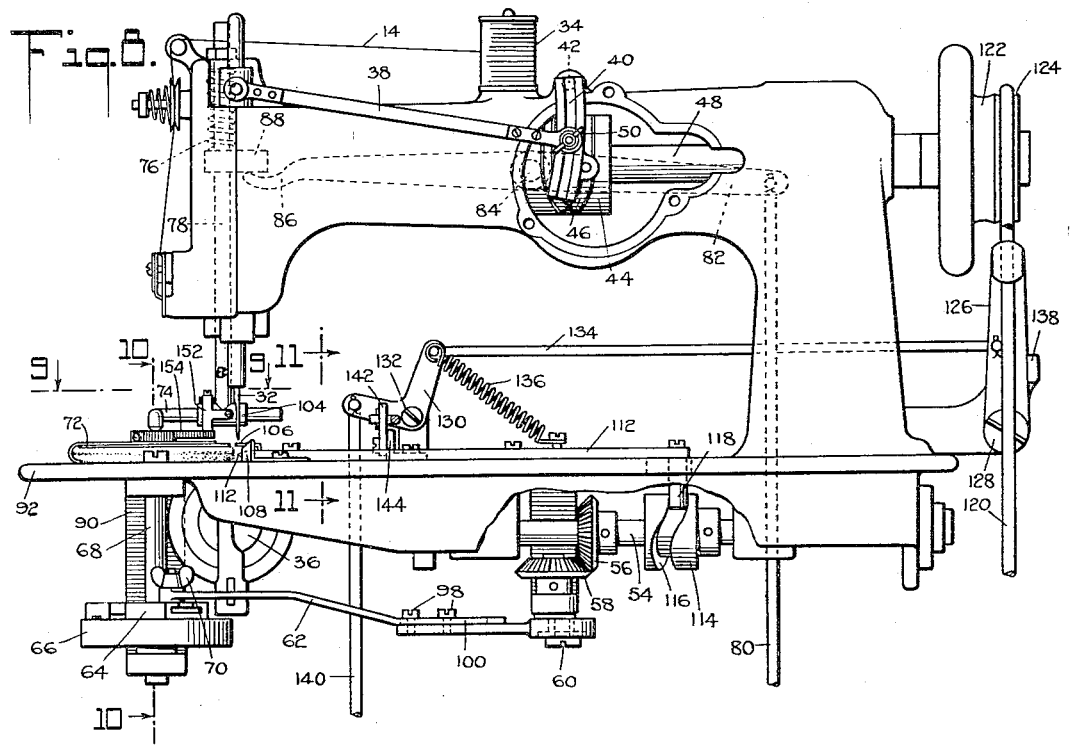

Feb. 13, 1934.   R. BIHLER   1,947,285
APPARATUS FOR MANUFACTURE OF POWDER PUFFS
Filed June 23, 1930   3 Sheets-Sheet 3
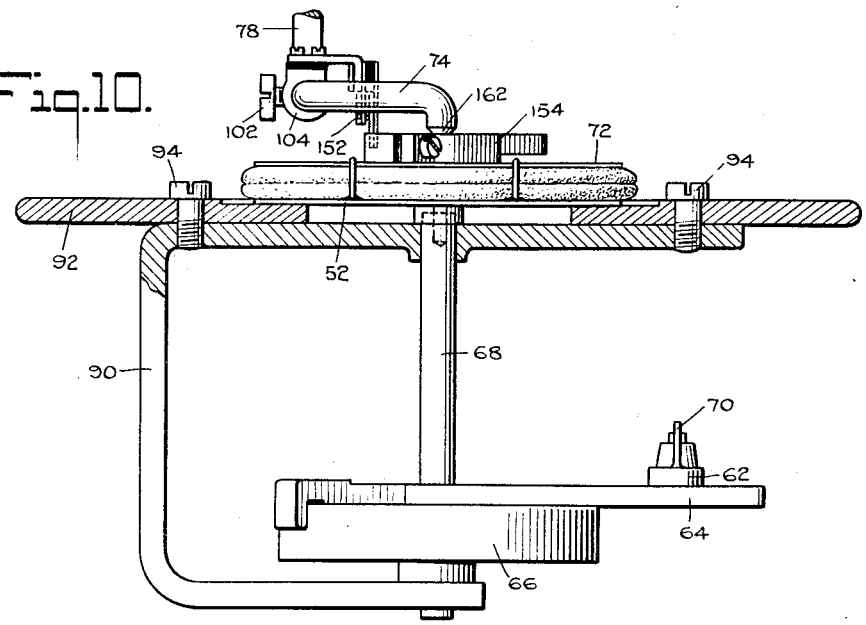
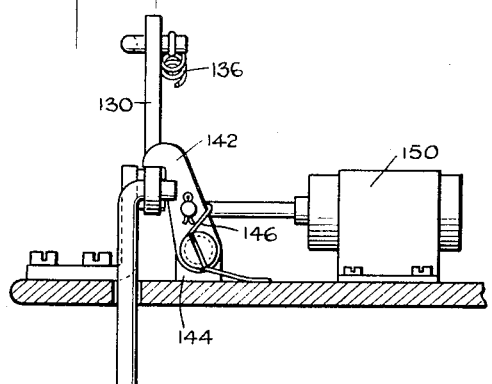
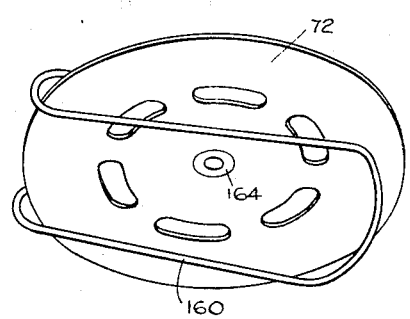
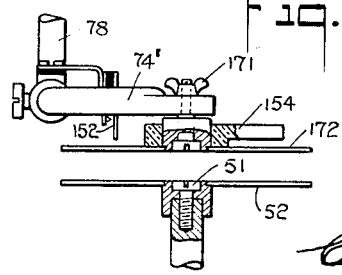
INVENTOR
Roger Bihler
BY
ATTORNEYS Patented Feb. 13, 1934

1,947,285

UNITED STATES PATENT OFFICE 1,947,285

APPARATUS FOR MANUFACTURE OF POWDER PUFFS

Roger Bihler, College Point, N. Y., assignor to Michael A. Belkoff, College Point, N. Y., and Allen A. Slade, Rye, N. Y.

Application June 23, 1930. Serial No. 463,007

13 Claims. (Cl. 112—2)

This invention relates to multi-ply enclosed articles, particularly powder puffs, and to apparatus for manufacturing same.

In manufacturing powder puffs, a plurality of circular plies of plush or velour fabric are superposed face to face or nap to nap, and stitched for most of their periphery. Special machines have been devised to facilitate this stitching operation in an attempt to make it possible to manufacture powder puffs by quantity production methods, and such a machine is disclosed in my copending application Serial No. 128,885 filed August 12, 1926, since issued as Patent No. 1,808,805 dated June 9, 1931.

The pouch thus formed is inverted or turned inside out so as to bring the plush or velour surface outermost, after which the puff may be stuffed with a suitable soft filling, if desired. The opening which remains is then stitched by hand.

The primary and general object of the present invention is to provide a powder puff which is united entirely around its periphery with machine stitching, and further resides in the provision of a method for making such a powder puff, and apparatus for practicing the method, so that powder puffs may be made entirely by quantity production methods with relatively unskilled help. The improved puff and the method of making the same are not claimed herein, being described and claimed in my divisional application Ser. No. 542,020 filed June 4, 1931, since issued as Patent No. 1,864,886 dated June 28, 1932.

When the opening in a powder puff, after turning the same, is closed, it is desirable that the fabric be turned inward and held together by a concealed stitch, so that the portion of the periphery which is sewed after turning will not be obviously distinguishable from any other portion of the periphery. It is also desirable that the stitching employed be sufficiently open and spaced to prevent the periphery from becoming hard and knotty, so that the entire puff including the periphery thereof will be soft and velvety to the touch. These facts have encouraged the survival of hand methods for closing the puff, because in the hand method a peculiar stitch may be taken which turns the fabric inwardly and conceals the stitch, holding the same together. However, this stitch is tedious and time consuming to make.

Accordingly, it is another object of the present invention to provide a machine stitched powder puff in which the stitching will be invisible, or if preliminarily visible will be of such a nature that it may subsequently be drawn taut and thereby concealed. Another object of my invention is to provide apparatus for so stitching the opening in turned powder puffs.

Many powder puffs are provided with a ribbon which extends diametrically across the puff. Such a ribbon is commonly provided by placing the ribbon between the superposed circular plies of material when the same are first stitched, the said stitching passing through and attaching one end of the ribbon. The puff is then turned, thereby not only bringing the soft faces of the fabric outermost, but also bringing the ribbon on the outside. In accordance with prior methods, the free end of the ribbon was tucked into the opening and attached to the puff when the opening was hand sewed. Further objects of the present invention are to attach such ribbon to the puff by machine stitching, and to provide apparatus for this purpose.

To the accomplishment of the foregoing and such other objects as will hereinafter appear, my invention consists in the powder puff and method and apparatus for making the same as hereinafter are more particularly described in the specification and sought to be defined in its apparatus aspect in the claims. The specification is accompanied by drawings in which:

Fig. 8 is a partially cut away side elevation of a machine for performing the stitching operation;

Fig. 9 is a fragmentary plan view taken in the plane of the line 9—9 in Fig. 8;

Fig. 10 is a partially sectioned elevation taken in the plane of the line 10—10 in Fig. 8;

Fig. 11 is a detail section taken in the plane of the line 11—11 in Fig. 8;

Fig. 12 is a perspective view of a powder puff holder; and

Fig. 13 is a detail of a modification.

My improved powder puff and method for making the same may best be described with reference to Figs. 1 through 7 of the drawings.

While the invention is generally applicable to enclosed multi-ply articles, it is particularly important and is here described in connection with the manufacture of powder puffs. For this purpose, a suitable soft fabric such as plush or velour is cut to circular configuration so as to form a plurality of discs of material the size of which depends upon the size of puff intended to be manufactured.

Figure 1:
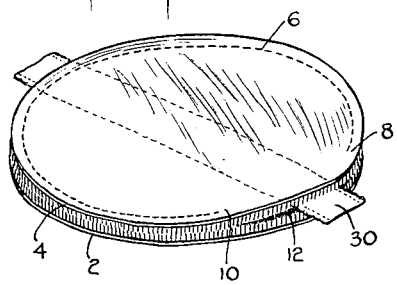
Fig. 1 illustrates the first step in the manufacture of a powder puff.

A pair of plies are then superposed in face to face relation, that is, with their soft sides or naps innermost as is indicated by the plies 2 and 4 in Fig. 1 of the drawings. This assembly is then stitched for most of its periphery with a circular line of stitching 6 extending from the points 8 to 10 and leaving an unstitched opening 12. This stitching operation may obviously be done with a sewing machine instead of by hand, and in order to make possible the rapid production of puffs which are truly circular and accurate in size, special powder puff sewing machines have been devised for this stitching operation. Such a machine is disclosed and claimed in my prior copending application Serial No. 128,885 previously mentioned.

The pouch thus formed is next inverted or turned inside out so as to bring the finished surface of the plies of material 2 and 4 outermost and also to enclose and conceal the line of stitching 6. The puff then takes the form shown in Fig. 2 which contains the opening 12. If desired, suitable soft filling material may be placed within the puff through this opening, after which the opening must be closed. This has heretofore been done by hand with a peculiar stitch which it is impossible to duplicate by machine and which serves to draw or tuck the edges of the material at the opening inward so that the resulting peripheral portion of the puff is not conspicuously distinguishable from the machine sewed periphery of the puff. This hand sewing process is tedious and slow, relative to machine methods, and does not result in perfectly uniform results, for the portion of the periphery which is sewed by hand seldom takes a truly arcuate shape of proper size to result in a perfectly round finished puff.

In accordance with the present invention, the opening is closed by a novel staggered stitch employing upper and lower threads which are looped together in a manner which is readily accomplished by machine. This stitch is clearly shown in Fig. 7 and comprises an upper thread 14 and a lower thread 16 which are looped together outside of the puff, as at the loop 18, in such a manner that tension subsequently applied to the ends 20 and 22 of the threads pulls the threads taut and tends to draw the material of the plies 2 and 4 of the puff over the stitch so as to conceal the same. Considering the stitch more in detail, it will be observed that the upper thread 14 and lower thread 16 are alternately looped inside of the puff, as at 24, and outside of the puff, as at 18.

This stitch is essentially a machine stitch, and its formation may best be, and will be hereinafter, described in connection with the sewing machine of my invention which makes the same, but it may briefly be stated at this point, that the edges of the plies of material 2 and 4 are preliminarily bent inward at the opening, and that the upper thread 14 is passed downwardly through the material of the puff and looped with the lower thread 16 to form a loop 24 inside of the puff, after which the upper thread 14 is passed downwardly outside of the periphery of the puff and looped with the lower thread 16 to form a loop 18 outside of the puff, after which the upper thread 14 is again passed downwardly through the material of the puff and looped with the lower thread 16 to form another loop 24 inside of the puff, and so on. Between the taking of each of these stitches, and preferably when the needle is retracted from the puff, the material at the opening may be pushed inwardly.

Figure 3:
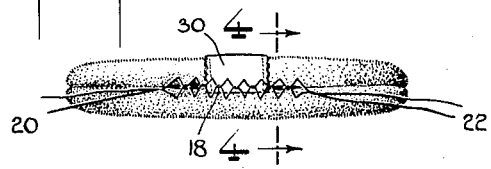
Fig. 3 illustrates the preliminarily exposed stitching which closes the opening.
Figure 6:
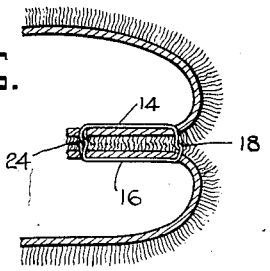
Fig. 6 is an enlarged section taken in the plane of the line 6—6 in Fig. 5.
Figure 7:
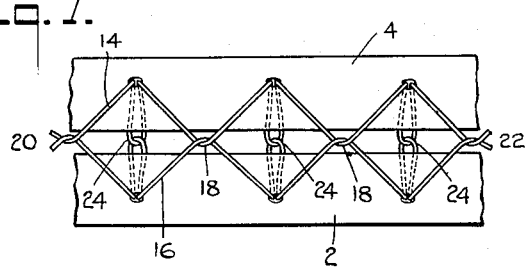
Fig. 7 is explanatory of the stitch employed.

The puff is then in the condition illustrated in Fig. 3 and is closed, but in a relatively loose manner, with the external loops 18 of the stitching exposed. The condition of the puff at this time is also clearly indicated in Fig. 4. At this point, the material of the puff at the opening may be again pushed inwardly to insure that the edges will remain in the desired inwardly bent relation, which incidentally loosens the loops of stitching. In accordance with my method, the ends 20 and 22 of the threads 14 and 16 are next drawn taut, and this takes up the slack in the loops of thread and tends to draw the material at the edge of the puff over the stitching, as is best indicated in Fig. 6. The opening is thus held closed by a staggered line of stitching which is located entirely inside of the puff or which may be left slightly exposed, according to the tension placed upon the threads before trimming the same from the puff.

Figure 2:
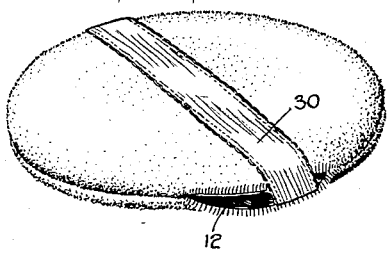
Fig. 2 shows the same after turning.

If the puff is to be provided with a ribbon, an appropriate strip of ribbon 30 is placed between the plies 2 and 4 of material when the puff is first stitched. The points 8 and 10, determining the line of stitching 6 and the opening 12 therebetween, are located at either side of one end of the ribbon 30, the other end of the ribbon being attached by the line of stitching 6. The puff is then turned, and the turning operation is actually facilitated by the ribbon 30, which comes outside of the turned puff and is stretched diametrically over one of the faces of the same, as is shown in Fig. 2.

Figure 5:
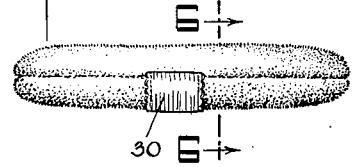
Fig. 5 illustrates the finished puff after the stitching has been drawn taut and the ribbon reversed.

In accordance with the present invention, if the ribbon 30 has a right side and a wrong side, it is first placed over the puff with the wrong side uppermost. The end of the ribbon is tucked into the opening when the material at the edges of the opening is folded inwardly, and the puff is machine stitched with the stitch previously described exactly as if the ribbon were not present, the stitching passing through the ribbon just as it passed through the material of the puff, as is evident from Fig. 3. When the ends 20 and 22 of thread are drawn taut and trimmed from the puff, some of the external loops of stitching may remain somewhat exposed, particularly at the end of the ribbon, because the surface of the ribbon is not soft like the surface of the puff itself. However, the ribbon is then turned to the opposite side of the puff, as shown in Fig. 5, or in other words, is turned upon that side of the puff which causes the end of the ribbon to conceal, rather than expose, the stitching attaching the same to the puff. If the ribbon has a wrong and a right side, the better side is then brought outermost as it should be.

The invention in its article and method aspects is claimed in my divisional Patent No. 1,864,886 heretofore referred to. A preferred form of sewing machine for practicing the method is, however, described and claimed in the present parent application. The machine comprises, generally, stitching mechanism, feed mechanism, pusher mechanism, and automatic stopping mechanism.

Referring to Fig. 8 of the drawings, it will be observed that the stitching mechanism comprises a needle 32 supplied with an upper thread 14 from a spool 34, the thread 14 passing through thread feeding and tensioning mechanism of conventional type. The stitching mechanism further comprises a shuttle 36 located beneath the needle 32, and carrying the lower thread 16, not shown, and serving to loop the same with the upper thread 14.

The needle 32 is not only reciprocated longitudinally, but is also reciprocated transversely, so that alternate stitches will be taken through the material of the puff and outside of the periphery of the puff. For this purpose, the needle actuating mechanism is oscillated through a connecting rod 38 driven by an oscillatable member 40 pivoted at 42 and oscillated by a cylindrical cam 44 bearing cam slots 46 in which a cam follower affixed to the lower end of the oscillatable member 40 is carried. The cam 44 may be rotated at half the speed of the main needle operating shaft 48 or may, as in the present case, be directly affixed to the needle operating shaft and be provided with a double cam groove so designed that the member 40 is oscillated only once in two revolutions of shaft 48, so that the needle 32 may make a nearly complete downward and upward reciprocation in one of its positions and then be moved to the other of its positions and make a nearly complete downward and upward reciprocation in the latter position.

The cam grooves 46 are, of course, so designed that the movement of the needle 32 takes place in a small fraction of a revolution, and this movement is timed to take place when the needle is at the upper end of its stroke. The movement of the needle may be adjusted by releasing a wing nut 50 at the end of the connecting rod 38 and changing the position thereof on the oscillatable member 40.

It will be appreciated that the shuttle 36 is so designed that it will loop the thread carried by the needle 32 in either of the positions of the needle. It is thought that the stitching mechanism need not be described in further detail because it is of conventional type, even including the transverse reciprocation of the needle, for such a movement has been used heretofore in embroidery sewing machines of various types.

The sewing machine is provided with suitable feed means to permit the material of the puff to be fed past the stitching means. This feed means may be manually operated, but preferably is automatically operated, and in either case it may best comprise a rotatable work support so that the desired arcuate line of stitching may be obtained. If automatic feed mechanism is employed, it may be of the continuous type, in which case the resilience of the material of the puff is relied upon to permit the needle to penetrate and be retracted therefrom, but preferably is of the intermittently operated type.

Referring now to Figs. 8, 9, and 10 of the drawings, the feed mechanism comprises a lower disc or table 52 which acts as a rotatable feed mechanism. This work support is preferably intermittently rotated by suitable drive mechanism which may, if desired, be like that disclosed in my copending prior application Serial No. 128,885 previously referred to. The present arrangement, however, provides more room for the shuttle 36 and is, therefore, preferred.

In the present arrangement, a shaft 54, which is provided in the sewing machine for operation of the shuttle 36, has added thereto a mitre gear 56 meshing with mitre gear 58 to which there is rotatably fixed a small crank or eccentric 60 of appropriate construction. This crank is connected by means of a connecting rod 62 with a clutch actuating arm 64 and serves to oscillate the same. The arm 64 is operatively connected with a driven clutch wheel 66 so as to impart uni-directional movement thereto in a manner well known in the art. That is, arm 64 and wheel 66 are interconnected by a one-way clutch mechanism, corresponding in its operation to a pawl and ratchet mechanism, whereby the oscillation of arm 64 is changed into uni-directional intermittent rotation of the wheel 66. The driven wheel 66 is rotatably fixed on a vertical spindle 68 on the upper end of which the work supporting disc 52 is mounted. It will thus be seen that as the sewing machine is operated, the crank 60 is rotated, thereby causing oscillation of the clutch operating arm 64 which in turn causes intermittent uni-directional rotation of the work supporting table 52. The timing is suitably adjusted so that the movement of the table takes place during the retraction of the needle 32. For a given size of puff the rotation of the work table between each stitch determines the size of the stitch, and this in turn may be adjusted by releasing the wing nut 70 and changing the position of the connecting rod 62 on the clutch actuating arm 64.

The sewing machine further includes means for holding the work against the work supporting disc 52. This means preferably includes an upper disc 72 which is rotatably mounted on the end of a presser foot 74' which in turn is urged downwardly by resilient means 76 acting through a plunger 78.

In the modification shown in Fig. 13, the upper disc or presser plate 172 is freely rotatably mounted on presser foot 74' carried by plunger 78. Presser foot 74' and plunger 78 in Fig. 13 correspond generally to the similarly identified elements in Figs. 8, 9, and 10. The presser plate 172 may be elevated for the insertion of a powder puff, by elevating plunger 78, and this is done in a manner almost self-evident in Fig. 8. Referring to the said figure, tension applied to a rod 80 through a foot treadle not shown, oscillates lever 82 clockwise about pivot 84, thereby causing the end 86 of the lever to force the plunger 78 upward by means of a block 88 and against the downward pressure of the spring 76. In the preferred form of my invention, unlike the modification shown in Fig. 13, and for reasons subsequently described, the upper disc 72 is not elevated with presser foot 74 when the said presser foot 74 is raised. In either form of the invention, the conventional mechanism for releasing the thread tension when plunger 78 is raised is retained in order to facilitate removal of the work from the machine.

In order to accommodate different sizes of puff, the feed means is preferably arranged so that the distance of the axis of rotation may be moved relative to the stitching mechanism. From the drawings it will be clear that the rotatable work support 52 and its spindle 68 are carried by a U-shaped bracket 90. This is attached to the bed plate 92 of the sewing machine by means of screws 94 which, when loosened, are reciprocable in slots 96. At the same time, the connecting rod 62 consists of two portions which are connected together by screws 98 located in a slot 100. The presser plate 72 or work clamping means must always be kept co-axial with the work supporting disc 52, and this adjustment is provided by loosening set screw 102 and sliding presser foot 74' in a collar 104 located at the bottom of the plunger 78. It is evident that by loosening screws 94, 98, and 102, the work feeding mechanism may be moved bodily nearer to, or further from, the stitching mechanism in order to accommodate different sizes of work.

If desired, the work supporting disc 52 may be replaced by another of different size at the same time that the foregoing adjustment is made. This may be done simply by releasing the screw 51, shown in Fig. 13. Similarly, the presser plate 172 may be correspondingly changed by releasing the wing nut 171, shown in Fig. 13. The upper disc 72, shown in the other figures, forms a part of a completely detachable holder described subsequently, and, of course, different sizes of holder may be used for different sizes of puffs.

Figure 4:
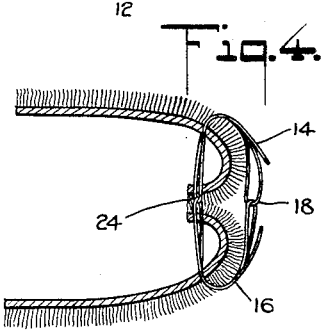
Fig. 4 is an enlarged section taken in the plane of the line 4—4 in Fig. 3.

An important feature of the present machine is the means for pushing the material at the opening of the puff inward during the stitching operation. This is done because it is preferred that the inside loops of stitching penetrate not only the upper and lower plies of material, but also the turned-in edges thereof, as is best shown in Fig. 4 of the drawing. The present machine accomplishes this desired result with the aid of fixed guides and a reciprocable pusher finger. These are best shown in Figs. 8 and 9, in which there are shown fixed guides 106 and 108 the latter of which bends the fabric of the puff inward to a pre-determined dimension relative to the inside and outside positions of the needle, respectively indicated at 32 and 32', so as to insure that every other stitch will and the alternate stitches will not penetrate the material of the puff. The fixed guides 106 and 108 are adjustable by reason of the slots 110.

The material at the opening of the puff is pushed inward during the stitching operation by a reciprocable pusher finger 112. To prevent breakage of the needle, either, or as in the present case, both of two expedients may be resorted to. First, the pusher finger 112 is reciprocated toward the puff when the needle is retracted from the puff, and second, the pusher finger may operate just to one side of the needle 32. To reciprocate the pusher finger 112, a cylindrical cam 114 is mounted on shaft 54 and is provided with a cam groove 116 which actuates a cam follower 118, which in turn is attached to one end of the reciprocable pusher finger 112. It is clear that the desired synchronism of the operation of the needle 32 and the pusher finger 112 will be obtained automatically, and that the desired time sequence thereof may be adjusted by varying the position of the cam 114 on the shaft 54.

Power is supplied to the sewing machine through a belt 120, and the sewing machine is provided with a fixed pulley 122 and a loose pulley 124, to either of which the belt 120 may be shifted by an oscillatable belt shifting arm 126 pivoted at 128. The belt shifting arm 126 is operatively connected to a bell crank 130 pivoted at 132 by a link 134. The bell crank 130 and belt shifting arm 126 are urged clockwise by a spring 136, the resulting movement being limited by a fixed stop 138 so that the belt 120 normally rides on loose pulley 124. The other arm of bell crank 130 is connected by means of a tension rod 140 to a suitable foot treadle, so that by depressing the treadle, the machine may be started, and by releasing the treadle the machine is stopped. By suitable pedal operation of the treadle controlling rods 80 and 140, the presser foot 74' may be elevated, a puff placed in the machine, presser foot 74 depressed, and the machine started, and finally the machine may be stopped and presser foot 74' may be elevated to permit removal of the work.

In order to speed up the operation of the machine, I prefer to provide automatic means for stopping the same. To this end, a latch 142, best shown in Figs. 8 and 11, is oscillatably mounted on a bracket 144 adjacent bell crank lever 130 and is urged by a spring 146 into holding relation with the bell crank lever. When the starting treadle is depressed, the belt 120 is shifted to fast pulley 122 and is held there against the tension of spring 136 by latch 142.

Additional means are provided to release latch 142 at the end of the desired stitching operation. This may take the form of a mechanical cam or trip, suitably geared down from either the shaft 48 or the shaft 54, or mounted on the vertical spindle 68 of the work feeding means so as to trip the latch 142 after the work feeding means has rotated through a pre-determined arc. In the present case I provide electrical trip means comprising a suitable electromagnet or solenoid 150 (see Fig. 11) which, when energized, pulls latch 142 away from bell crank lever 130 and so stops the machine. To energize the electrical trip means, a pair of spring contacts 152 are mounted upon and insulated from collar 104, as is best shown in Figs. 9 and 10. Presser plate 72 has mounted thereon an insulation arm 154 which is so dimensioned that during the rotation of the presser plate 72, the arm 154 reaches and causes contact between the spring contacts 152, thereby closing the trip circuit and stopping the machine. It will be understood that such a trip means may be mounted upon the presser plate 172, as is illustrated in Fig. 13, and that to operate the machine it is merely necessary to locate the pointer 154 at the end of the opening in the puff when first placing the puff in the machine. In this manner the machine may be automatically stopped when the end of the opening is reached regardless of variations in the size of the opening in different puffs of the same size.

As was outlined in connection with Figs. 1 through 7 of the drawings, the present manufacturing method requires certain manual operations. For example, after the puff has first been sewed, as in Fig. 1, it must be turned and filled. The edges of the opening must then be turned in and prepared for the present machine stitching operation. After the machine stitching operation has been performed, the edges of material are again preferably pushed inward, and the ends of the threads drawn taut before being trimmed from the puff. In order to keep the sewing machine in continuous operation so as to obtain maximum output, it is desirable to distribute the desired operations so that only the stitching of the opening need be performed at the machine. To further this end, I have arranged a device to detachably receive and engage a powder puff holder, shown in perspective looking from the bottom in Fig. 12, which holder replaces the presser plate 172, shown in Fig. 13. The holder comprises a disc 72 to which there is attached a suitable spring wire 160, an upwardly projecting hub 164, and an insulation pointer 154 encompassing hub 164, as is shown in Figs. 8, 9, and 10, but is not visible in Fig. 12. The spring wire 160 is bent into U or hair pin shape, and is then doubled over upon itself, so that upon securing the open ends of the wire to the flat disc 72, the closed middle portion of the wire is spaced from the disc 72 (see Fig. 12) so that a previously turned and stuffed powder puff may be inserted and held between the spring wire and the disc (see Figs. 8, 9, and 10). The end of presser foot 74 is provided with a simple conical centering point which engages and centers the opening in the hub 164 mounted on the disc 72. In the present arrangement, when presser foot 74 is elevated it does not tend to lift disc 72 with it. In contrast, it will be remembered that in the arrangement of Fig. 13, the disc 172 is raised and lowered with presser foot 74'. The clamp screw 166 on the insulation pointer 154 is only partially tightened so that the pointer 154 is frictionally held in place, yet may be manually oscillated with respect to the hub 164. A large number of detachable holders such as have just been described are provided for each sewing machine.

To recapitulate, the relation of the two illustrated arrangements for holding the puff is as follows. In the arrangement of Figs. 12 and 13, that is, in either form of work holding means, the lower disc or table 52 is secured to shaft 68 and revolved thereby. In the arrangement of Fig. 13 the upper disc 172 is permanently secured to but is freely rotatable on the presser foot 74 and therefore is elevated and lowered with said presser foot. In the arrangement of Fig. 12, however, the upper disc 72 is in no way secured to the presser foot. Instead, a previously turned and stuffed powder puff is inserted in the holder of Fig. 12 between the spring wire 160 and the disc 72. The holder and puff are then laid on table 52, after which presser foot 74 is depressed. In this case the presser foot 74 has a simple pointed or conical end which fits into the hole in hub 164 of the holder and serves to guide the same coaxially with shaft 68.

In manufacturing the puffs, one set of operators may perform the machine stitching operation indicated in Fig. 1 of the drawings. Another set of employees may turn the puffs and stuff the same. Another set of employees mount the turned puffs in the holders, bend the edges of the opening slightly inward and set the pointer at the termination of the opening. The operators of machines like that here disclosed simply place the holder and puff on the rotatable work table 52 with the beginning of the opening in the puff at the needle, permit presser foot 74 to descend, and start the machine. The opening is stitched and the machine is automatically stopped when the end of the opening is reached. Still another set of workers may again push the material at the opening inward, if this step seems desirable, and draw the ends of the thread taut, and trim the same. If a ribbon is used on the puff, this ribbon is preferably reversed, as was previously described. The puff is then finished and may be packed for shipment.

It is believed that my novel powder puff closing machine and the many advantages thereof, will all be apparent from the foregoing detailed description. The opening in the stitched and turned puff is machine stitched with a stitch which, although initially externally exposed, is so arranged that when drawn taut, it tends to draw the cloth of the puff around in a manner which conceals the stitch. This may be accomplished with a pair of threads looped together, by means of a needle and shuttle in a conventional manner, except that only alternate stitches are taken within the puff. The material at the opening in the puff is constantly pushed inward and shaped to proper size during the stitching operation. The machine may be stopped automatically when the end of the opening is reached, regardless of the size of the opening, thereby making rapid production possible. Various sizes of puff may be accommodated by simple adjustment of the machine. The machine may be employed even when the puff is provided with a ribbon which must be sewed to the puff when the opening therein is closed.

It will be apparent that while I have shown and described my invention in the preferred form, many changes and modifications may be made in the structure disclosed without departing from the spirit of the invention, defined in the following claims.

I claim:

1. A powder puff sewing machine for machine stitching the opening left in the puff after turning the same, comprising stitching mechanism, means to transversely reciprocate said mechanism at alternate stitches so that one stitch will be taken through the material of the puff at the opening therein and the next stitch externally of the puff, and means to push the edges of the plies of the material at the puff opening inwardly during the stitching operation, in simulation of a turned seam.

2. A powder puff sewing machine for machine stitching the opening left in the puff after turning the same, comprising a needle, a shuttle, means to longitudinally reciprocate the needle and to transversely reciprocate the needle at alternate stitches, and means to push the edges of the plies of the material at the puff opening inwardly each time the needle is retracted therefrom, in simulation of a turned seam.

3. A powder puff sewing machine for machine stitching the opening left in the puff after turning the same, comprising stitching mechanism, means for receiving and holding the already turned puff with the opening therein adjacent the stitching mechanism and feeding the puff past the stitching mechanism, and means to turn and push the edges of the foundation material of the puff at the opening therein inwardly during the stitching operation, in simulation of a turned seam.

4. A powder puff sewing machine for machine stitching the opening left in the puff after turning the same, comprising stitching mechanism, means to transversely reciprocate said mechanism at alternate stitches so that one switch will be taken through the material of the puff at the opening therein and the next stitch externally of the puff, a rotatable work support for receiving and holding the already turned puff with the opening therein adjacent the stitching mechanism and feeding the puff past the stitching mechanism, and means to push the edges of the plies of the material at the puff opening inwardly during the stitching operation, in simulation of a turned seam.

5. A powder puff sewing machine for machine stitching the opening left in the puff after turning the same, comprising a needle, a shuttle, means to longitudinally reciprocate the needle and to transversely reciprocate the needle at alternate stitches, a rotatable work support for receiving and holding the already turned puff with the opening therein adjacent the stitching mechanism, means to rotate the support in order to feed the open edge material of the turned puff past the needle, means permitting adjustment of said work support toward and from the needle in order to accommodate different sizes of puffs, and means to push the edges of the plies of the material at the puff opening inwardly each time the needle is retracted therefrom, in simulation of a turned seam.

6. A powder puff sewing machine for machine stitching the opening left in the puff after turning the same, comprising stitching mechanism, means to transversely reciprocate said mechanism at alternate stitches so that one stitch will be taken through the material of the puff at the opening therein and the next stitch externally of the puff, a rotatable work support for receiving and holding the already turned puff with the opening therein adjacent the stitching mechanism and feeding the puff past the stitching mechanism, means to push the edges of the foundation material of the puff opening inwardly during the stitching operation in simulation of a turned seam, manually operable means for starting the machine, and automatically operable means for stopping the machine at the end of the puff opening.

7. A powder puff sewing machine for machine stitching the opening left in the puff after turning the same, comprising a needle, a shuttle, means to longitudinally reciprocate the needle and to transversely reciprocate the needle at alternate stitches, a rotatable work support for receiving and holding the already turned puff with the opening therein adjacent the stitching mechanism, means to rotate the support in order to feed the puff past the needle, means to push the edges of the plies of the material at the puff opening inwardly each time the needle is retracted therefrom, manually operable means for starting the machine, and means to automatically stop the machine when the end of the opening is reached.

8. In a powder puff sewing machine for machine stitching the opening left in the puff after turning and stuffing the same, a holder for the turned puff comprising a flat work supporting disc and a spring wire for holding said puff thereagainst.

9. In a powder puff sewing machine for machine stitching the opening left in the puff after turning the same, a holder for the puff comprising a work supporting disc, a spring wire for holding a puff thereagainst, and adjustable means for indicating the end of the opening in the puff, said means being adapted for automatic cooperation with stopping means on said machine.

10. A powder puff sewing machine comprising stitching mechanism, a holder for receiving and holding an already turned puff, means on said machine for supporting and feeding said holder and puff past the stitching mechanism, means to transversely reciprocate said mechanism at alternate stitches so that one stitch will be taken through the material of the puff at the opening therein, and the next stitch externally of the puff, and means to turn and push the edges of the foundation material of the puff opening inwardly during the stitching operation, in simulation of a turned seam.

11. A powder puff sewing machine for machine stitching the opening left in the puff after turning the same, comprising stitching mechanism, a rotatable work support for feeding the puff past the stitching mechanism, a holder for the puff including a work supporting disc, a spring wire for holding a puff thereagainst, and stop means, means on said machine for rotatably supporting said holder against the rotatable work support, manually operable means for starting the machine, and means cooperating with the aforesaid stop means on the holder for automatically stopping the machine.

12. A powder puff sewing machine for machine stitching the opening left in the puff after turning the same, comprising stitching mechanism, means for receiving and holding the already turned puff with the opening therein adjacent the stitching mechanism and feeding the puff past the stitching mechanism, adjustable means for indicating the end of the opening in the turned puff, manually operable means for starting the machine, and means cooperating with the aforesaid adjustable means for automatically stopping the machine when the end of the opening is reached.

13. A powder puff sewing machine for machine stitching the opening left in the puff after turning the same, comprising a needle, a shuttle, means to longitudinally reciprocate the needle and to transversely reciprocate the needle at alternate stitches, a rotatable work support, means to rotate the support in order to feed the puff past the needle, a holder for the puff including a work supporting disc, a spring wire for holding a puff thereagainst, and adjustable means for indicating the end of the opening in the puff, a reciprocable presser foot on said machine for rotatably supporting and urging said holder against the rotatable work support, means to push the material of the puff inwardly each time the needle is retracted therefrom, manually operable means for starting the machine, and means cooperating with the aforesaid adjustable means on the holder for automatically stopping the machine when the end of the opening is reached.

ROGER BIHLER.